Inventor
Guy K. Mitchell.
By Robert Watson
Attorney

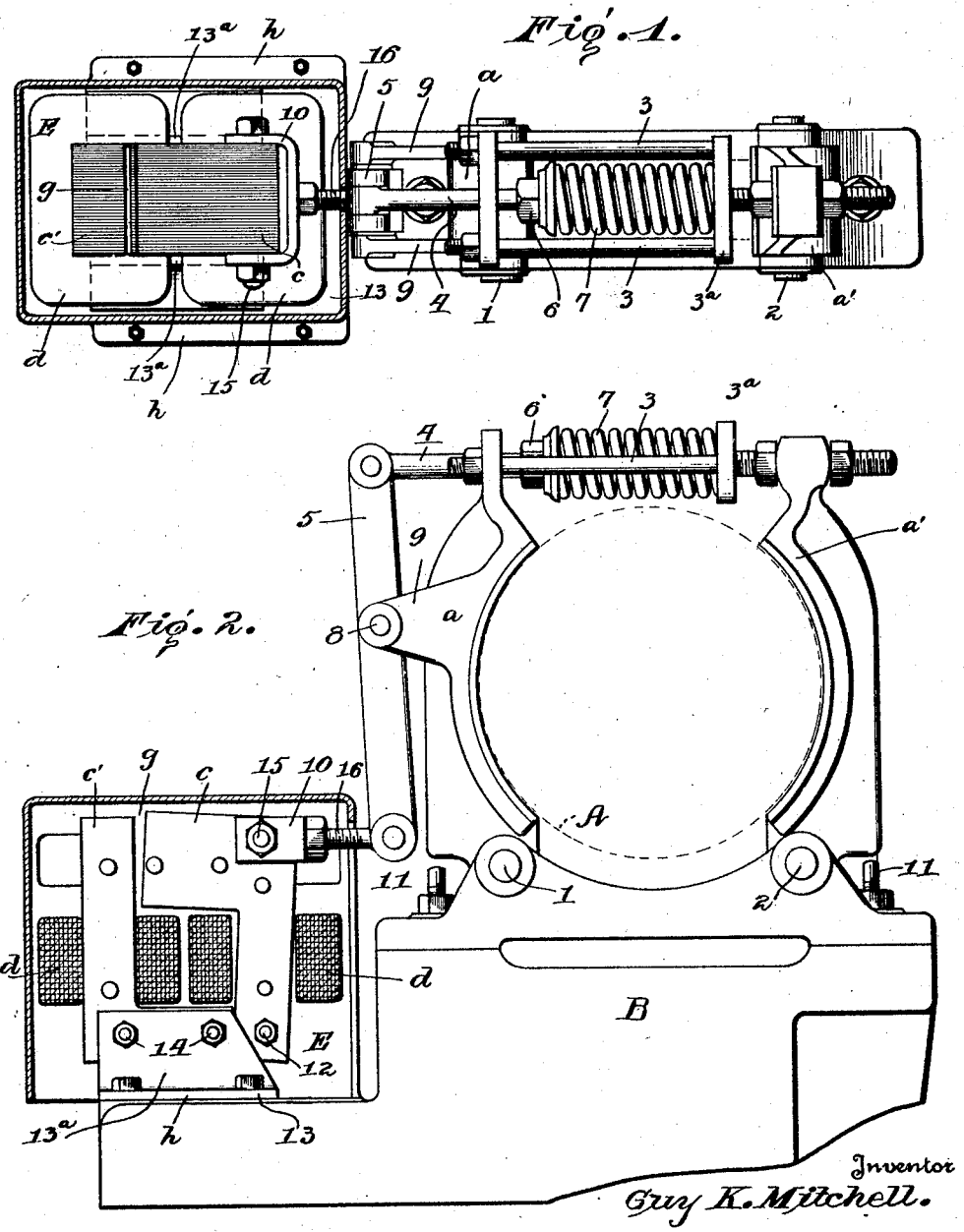

Patented Oct. 13, 1925.

1,557,465

UNITED STATES PATENT OFFICE.

GUY K. MITCHELL, OF BALTIMORE, MARYLAND.

ELECTROMAGNETIC BRAKE.

Application filed April 9, 1920. Serial No. 372,481.

*To all whom it may concern:*

Be it known that I, GUY K. MITCHELL, a citizen of the United States, residing at Baltimore, in the State of Maryland, have invented certain new and useful Improvements in Electromagnetic Brakes, of which the following is a specification.

This invention relates to improvements in electromagnetic brakes, and more particularly to the magnetic means for operating the brake shoes. In electric elevators, the brake shoes are normally applied to a brake drum, while the motor is stopped, by a strong spring, and the shoes are released and held out of engagement with the drum by means of an electro-magnet while the motor is running. Where the elevator is in active use, the brake magnet is energized the greater part of the time, with the result that the magnet coils become heated and the magnet loses a part of its attractive force. For this reason, it is customary to use a relatively large magnet where a smaller magnet with less expensive winding would answer if it were not for the loss in power and efficiency due to the heating. On the other hand, as the size of the magnet is increased, its radiating surface is not proportionately increased, and this has to be taken into account in designing a magnet of suitable size to operate the brake properly under all conditions. Where the alternating current is used, the magnets are generally larger than the magnets used on direct current circuits, on account of the greater heating effect caused by the alternating current. As the work to be performed by the brake magnet varies with the load capacity and speed of the elevator, it is customary to provide an assortment of magnets of varying sizes to suit the different hoisting machines and conditions.

In carrying out my invention, instead of employing the large single magnets above alluded to, I provide, as a unit, a relatively small magnet, suitable for operating a brake requiring the least amount of force, and for brakes requiring greater force, I add one or more magnetic units and connect them to the brake shoes so that the several units will pull together. For exerting the greater force, a number of small magnetic units is more efficient than a single magnet for the reason that the units have a greater amount of heat radiating surface, and as the units are all alike they can be made very inexpensively. Also, with polyphase currents, it may be desirable or necessary in some localities and in some situations to have the brake magnet connected to each leg of the circuit, and where this is the case a separate unit may be readily connected in each leg; whereas with one large single magnet it would be necessary to provide several windings upon the same core, which is not so desirable. The unit construction also makes the coil terminals accessible so that the coils may be connected in various ways through the medium of suitable switching devices.

The form of the magnet composing the unit comprises a core formed in two L-shaped parts, hinged together at one point and having a single air gap, each part of the core having a separate form-wound coil, the magnet being of high efficiency and simple in construction.

In the accompanying drawing, which illustrates my invention,

Fig. 1 is a top plan view of an electromagnetic brake showing a single magnet unit connected thereto;

Fig. 2 is a side view of the same; and,

Figure 3:
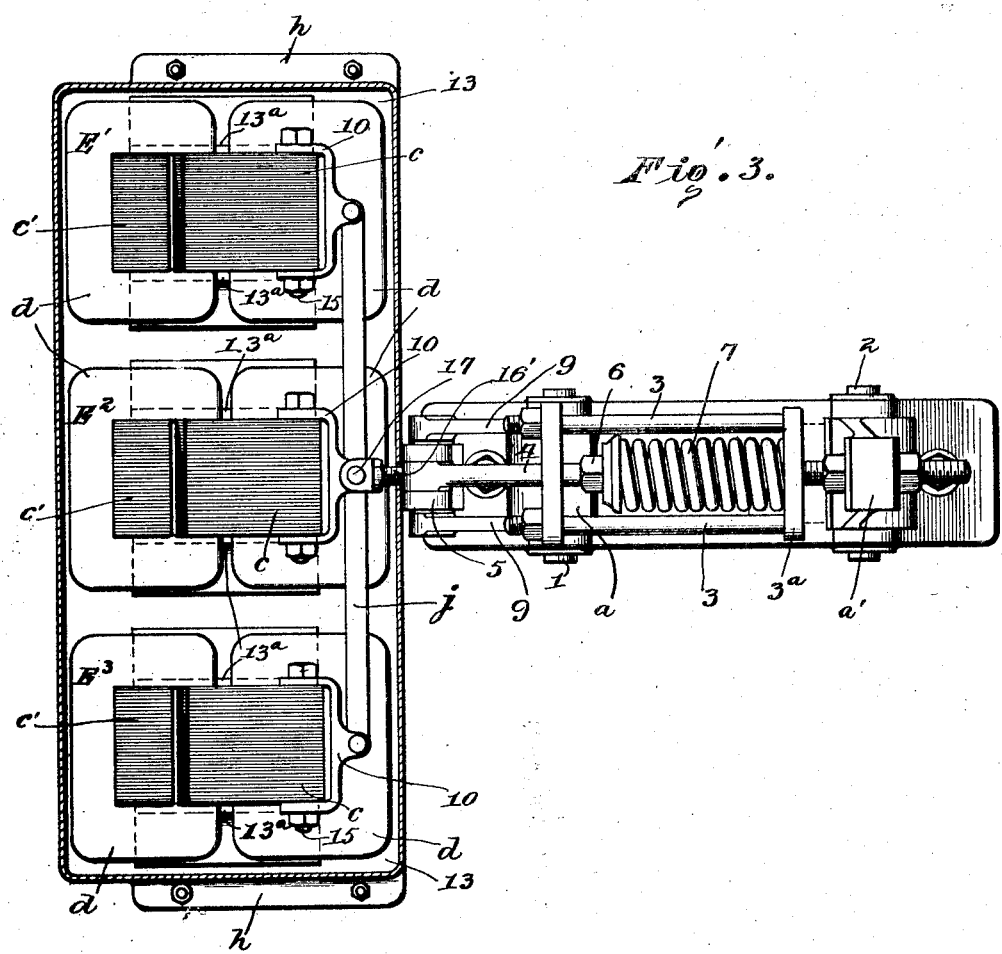
Fig. 3 is a top plan view of a brake showing three magnet units connected to brake shoes.

Referring to Figs. 1 and 2 of the drawing, A indicates a brake drum, which may be the brake drum of an electric elevator hoist, and B indicates the base of the hoisting mechanism, the latter not being shown. Brake shoes *a* and *a'* are pivotally connected to the base, as indicated at 1 and 2. The brake shoe *a* has connected to its upper end a yoke 3, and a rod 4, secured to the brake shoe *a'* extends freely through the yoke and through the upper end of the brake shoe *a* and is pivotally connected to a brake lever 5. The rod 4 is provided with an adjustable nut 6, between the arms of the yoke, and a spring 7 is interposed between said nut and the crosspiece 3ᵃ of the yoke. It will be evident that with this arrangement, the expansive force of the spring will normally hold the brake shoes in engagement with the brake drum. The lever 5 is connected centrally by a pivot 8 to lugs 9, projecting from the side of the brake shoe $a$. The lower arm of the lever is connected by a yoke 10, of non-magnetic material, with a movable member $c$ of an electro-magnet E. Stops 11 are arranged upon the base B, to limit the outward rocking movement of the brake shoes. With the arrangement described, it will be evident that when the lower end of the brake lever 5 is rocked outwardly, the brake shoe $a$ will be moved away from the brake drum and against its stop 11, and the further movement of the lever will cause the spring 7 to be compressed and the brake shoe $a'$ will thereby be forced away from the brake drum and against its stop 11. When the lever is released, the spring will again force the shoes against the brake drum.

The brake mechanism above described is of usual construction and forms no part of my invention.

The magnet E, Figs. 1 and 2, comprises two similar L-shaped core members $c$ and $c'$, each, for alternating current work, being laminated. The members when placed together form a rectangular core and they are connected together at one corner of the rectangle by a pivot bolt 12 so that the two parts of the core are relatively movable. Each part of the core carries a form-wound coil $d$, these coils being placed upon the core parts before the latter are assembled. One part $c'$ of the core is rigidly secured to a magnet supporting frame $h$ comprising a flat base 13, having upright flanges $13^a$, between which said core part is secured by bolts 14, passing through said flanges and said part. The magnet supporting frame is suitably secured to the base B of the hoisting mechanism. The yoke 10 is pivotally connected by a bolt 15 to the top of the movable member $c$ of the core. It will be evident that with this construction there is but one air gap, $g$, in the magnetic circuit and the width of this gap may be regulated by adjusting the yoke 10 toward or from the lever 5 by means of a threaded eye-bolt 16, which forms a connection between the yoke and the lever.

When current is applied to the coils $d$, the mutual attraction between the parts of the core causes the member $c$ to move in the direction to close the gap $g$, and by this movement the brake levers are rocked to release the brakes. When the current is cut off from the coils, the brake spring 7 restores the parts, including the movable member of the magnetic core, to their normal positions.

The single magnet above described constitutes a unit of small size suitable for a mechanism where only a relatively small braking force is required. Where a greater braking force is required the magnet units are increased accordingly. Thus, in Fig. 3, the magnet supporting frame $h'$ is enlarged and three magnet units $E'$, $E^2$ and $E^3$, each in all respects the same as the unit shown in Figs. 1 and 2, are secured to the supporting frame by flanges $13^a$ on said frame, these flanges being suitably spaced apart to embrace the sides of the magnet cores. The movable members $c$ of the units $E'$ and $E^3$ in Fig. 3 are connected to the opposite ends of a non-magnetic equalizing bar $j$, which latter is connected by a pivot pin 17 at its center with an eyebolt 16', which is connected to the brake lever 5. It is assumed that the spring 7, in Fig. 3, is stronger than in Figs. 1 and 2, and that a greater force is required to release the brakes. When the magnets are energized, it will be evident that they will all pull upon the equalizing bar and the force applied to the brake lever will be three times as great as where a single unit is used. If only twice the power of a single unit is required to release the brakes, then the central unit $E^2$ will be omitted and the units $E'$ and $E^3$, which are connected to the ends of the equalizing bar, will actuate the brake levers; or if a single unit will suffice, the end units and the equalizing bar may be omitted and the central unit $E^2$ will then be coupled directly to the brake lever and will actuate the brakes. If desired, supporting bases of different lengths may be used according to the number of units employed.

By providing small magnetic units, it is only necessary to make magnets of one size and any number can be attached to the brake mechanism, in the manner described, according to the size of the brake and the work to be performed. For polyphase circuits, where required, the various units may be connected in different legs of the circuit; and also the unit arrangement makes the coil terminals accessible so that the coils may be connected up in various ways, through suitable mechanism, not shown, as in series or in shunt. An important advantage of the small unit construction, as compared with the large single magnets, is the greater heat radiating surface, which has an important bearing upon the efficiency of the magnet.

What I claim is:

1. The combination with brake mechanism, including a spring for setting the brakes and a lever for releasing the same, of an equalizing bar connected to said lever and a plurality of magnets having movable parts connected to said bar and adapted, collectively, to move the same.

2. The combination with brake mechanism, including a spring for setting the brakes and a lever for releasing the same, of an equalizing bar connected to said lever, a stationary magnet-supporting frame, a plurality of relatively small magnets, each magnet having a two-part core and having one of said parts movable and operatively connected to said bar and the other part secured to said frame, said magnets adapted, collectively, to move said bar.

3. The combination with brake mechanism, including a spring for setting the brakes and a lever for releasing the same, of a magnet-supporting frame having a plurality of pairs of flanges, a plurality of electro-magnets each having a two-part core, one part of which is secured to a pair of flanges and the other part being movable, and connections between the movable parts of the cores and said lever, for moving the latter.

In testimony whereof I affix my signature.

GUY K. MITCHELL.